Dec. 6, 1938.　　　　　　E. J. DILLMAN　　　　　2,139,615
HEATING APPARATUS AND CONTROL MEANS THEREFOR
Original Filed May 19, 1934　　3 Sheets-Sheet 1
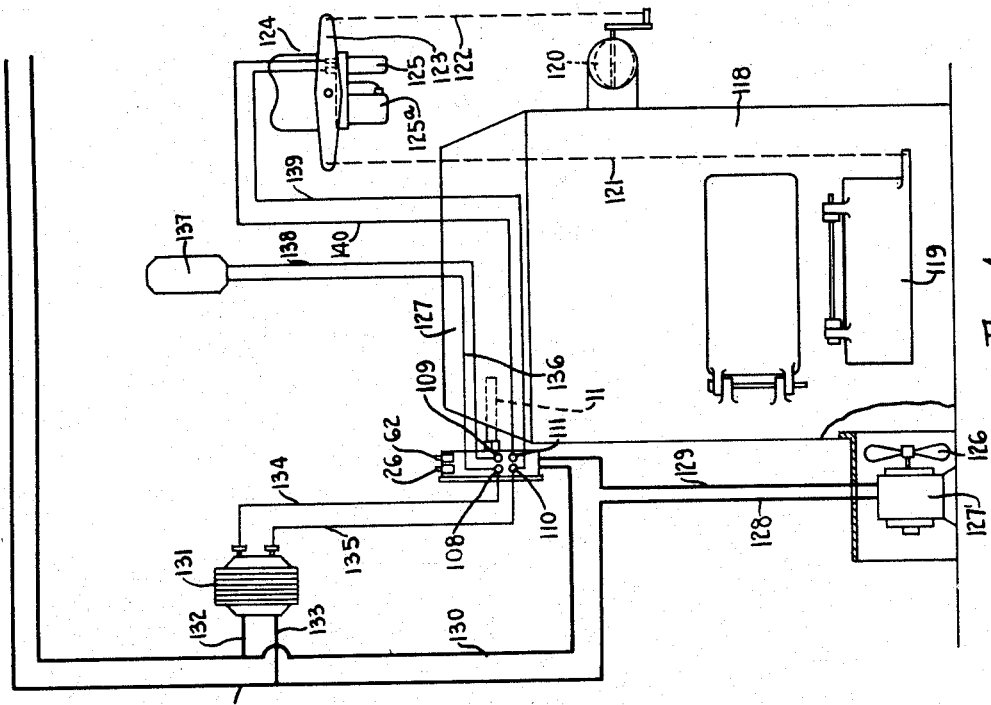
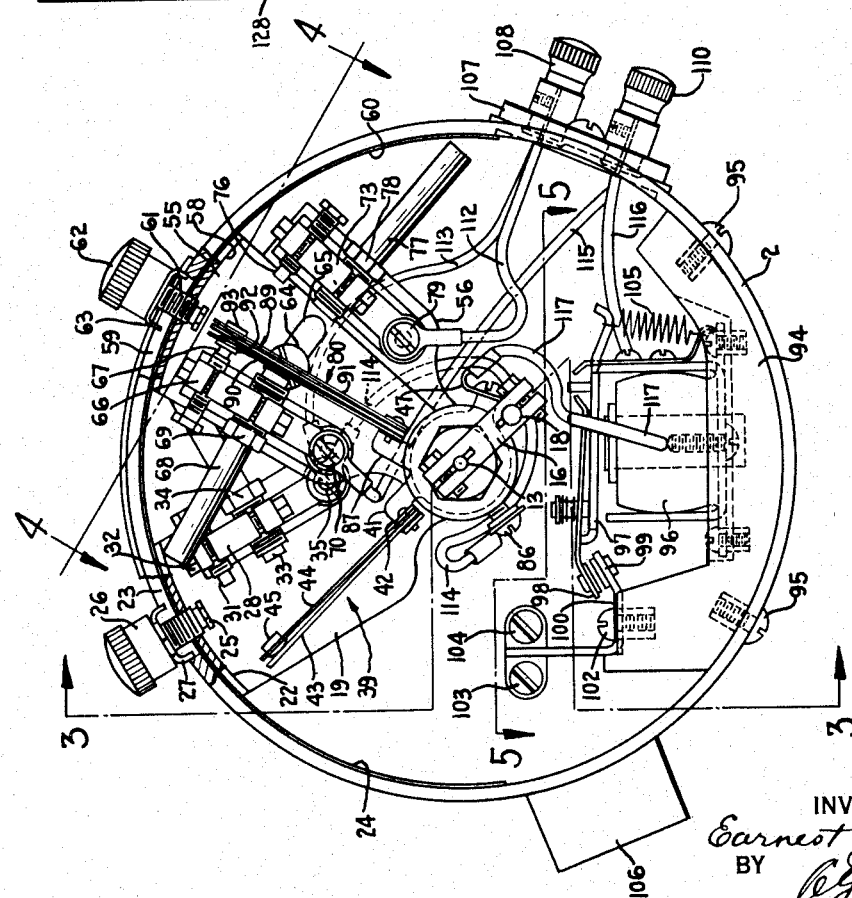
INVENTOR
Earnest J. Dillman
BY
his ATTORNEY Dec. 6, 1938.  E. J. DILLMAN  2,139,615
HEATING APPARATUS AND CONTROL MEANS THEREFOR
Original Filed May 19, 1934  3 Sheets-Sheet 2
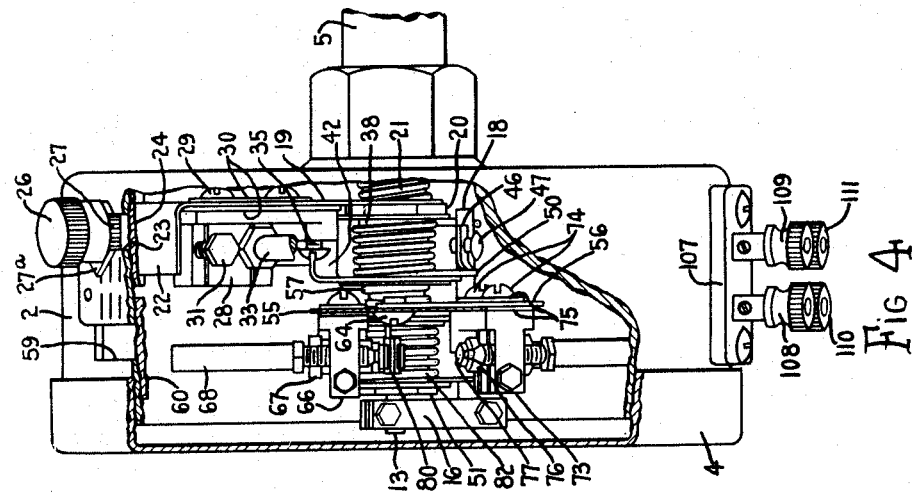
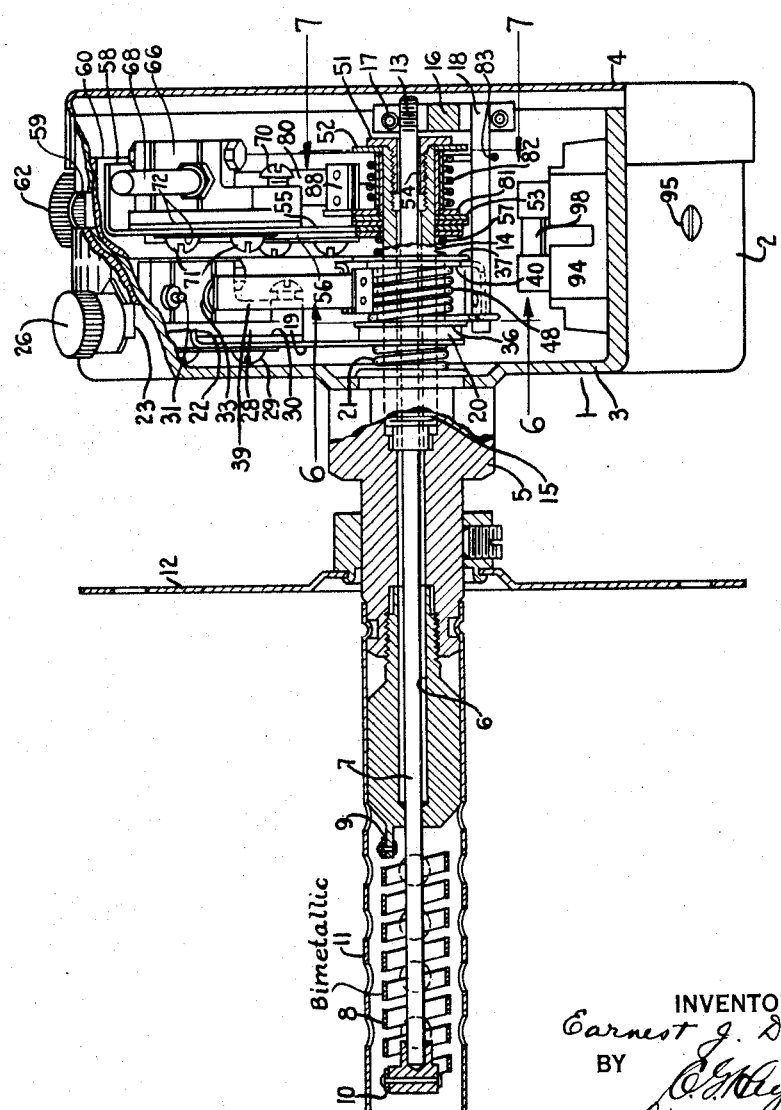
INVENTOR
Earnest J. Dillman
BY
his ATTORNEY Dec. 6, 1938. E. J. DILLMAN 2,139,615
HEATING APPARATUS AND CONTROL MEANS THEREFOR
Original Filed May 19, 1934   3 Sheets-Sheet 3
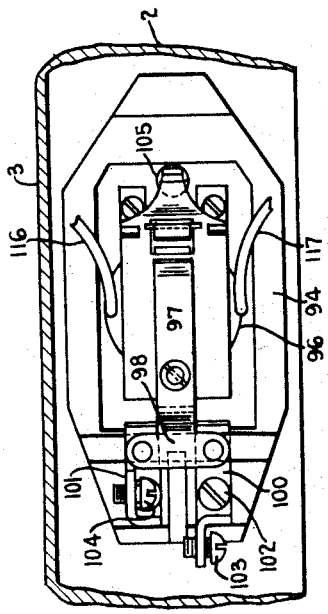
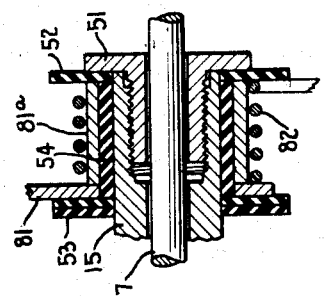
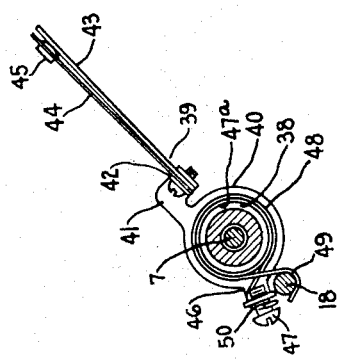
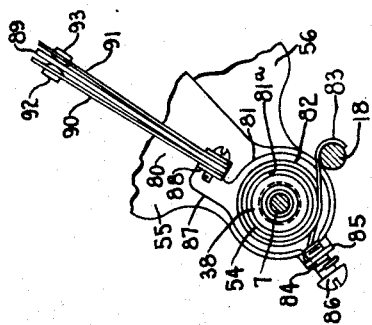
INVENTOR
Earnest J. Dillman
BY
his ATTORNEY Patented Dec. 6, 1938

2,139,615

UNITED STATES PATENT OFFICE 2,139,615

HEATING APPARATUS AND CONTROL MEANS THEREFOR

Earnest J. Dillman, Detroit, Mich., assignor to Detroit Lubricator Company, Detroit, Mich., a corporation of Michigan Original application May 19, 1934, Serial No. 726,586. Divided and this application September 7, 1935, Serial No. 39,578

20 Claims. (Cl. 200—138)

This application is a division of my copending application, Serial No. 726,586, filed May 19, 1934.

My invention relates generally to new and useful improvements in control means such as an automatically operated electric switch means which is particularly adapted for controlling the operation of a heating apparatus.

An object of my invention is to provide an electric switch having safety means to permit overtravel of the switch operating means.

Another object is to provide a plurality of electric switches having a common operating means.

Another object is to provide means by which the range of operation of the electric switch by the automatic means may be readily regulated.

The invention consists in the novel control of the heating apparatus and in the improved construction and combination of parts of the control means, to be more fully described hereinafter and the novelty of which will be particularly pointed out and distinctly claimed.

In the accompanying drawings, to be taken as a part of this specification, I have fully and clearly illustrated a preferred embodiment of my invention, in which drawings—

Figure 1 is a diagrammatic view of a heating apparatus embodying my control means;

Fig. 2 is a view in front elevation of the control means with the cover member of the casing removed;

Fig. 3 is a view in section substantially on the line 3—3 of Fig. 2;

Fig. 4 is a view in section on the line 4—4 of Fig. 2;

Fig. 5 is a detail view of certain relay mechanism taken on the line 5—5 of Fig. 2;

Figs. 6 and 7 are detail views taken on the line 6—6 and 7—7 respectively of Fig. 3, and Fig. 8 is an enlarged detail view in section on the line 3—3 of Fig. 2.

Referring to the drawings by characters of reference, I designates generally a supporting structure comprising a metal casing having a curved cylindrical side wall 2 closed by a rear wall 3 and having a front cover or closure member 4. Projecting centrally from the rear wall 3 there is an elongated external supporting member 5 having a longitudinally extending bore 6 therethrough in which an operating shaft 7 is rotatably supported. The shaft 7 is provided with a thermostatic actuating means 8 such as a helical coil of bimetal which surrounds the end of the shaft 7 which projects from the member 5. The coil 8 has one end secured, as at 9, to the member 5 and has its other end secured, as at 10, to the end of the shaft 7. A tubular perforated shield 11 is preferably provided for the coil 8 and is fitted on the rear end portion of the member 5. A supporting plate 12 surrounds the member 5 and serves as a means for securing the control means in operative position in a furnace bonnet, for example. The end 13 of the shaft 7 which projects into the casing extends through a bearing sleeve 14 which is screw-threaded or otherwise secured, as at 15, in the bore of the member 5. Fixed on the shaft end 13 there is a crank member 16 which is held against rotation relative to the shaft by a clamping screw 17. Projecting rearwardly from the free end of the crank member 16 there is a rod or pin 18 which lies in parallel spaced relation to the shaft 7 and which terminates adjacent the rear wall 3. Journaled about the shaft 7 within the casing there is a supporting plate or member 19 which is apertured to receive the bearing sleeve 14. The front face of the plate 19 abuts the rear face of a flange 20 rigid with the bearing sleeve and is held thereagainst by a helical coil spring 21. The spring 21 surrounds the sleeve 14 and is held under compression between the rear face of the plate 19 and the rear casing wall 3. The plate member 19 extends radially from the shaft 7 in substantially parallel relation to the wall 3 and terminates adjacent the side wall 2 where it is provided with a forwardly extending flange 22. Through the wall 2 there is a circumferentially extending slot 23 which overlies the flange 22 and which is closed by a slidable elongated closure strip 24 interposed between the wall 2 and the flange 22. The supporting plate 19 is adjustable about the shaft 7 and is held in adjusted position by a clamping screw 25 which travels in the slot 23 and carries the strip 24 and which is screw-threaded through the flange 22. Interposed between the head 26 of the screw 25 and the outside face of the wall 2 there is a clamping plate 27 which is held against rotation by depending fingers projecting into slot 23 and which is clamped into frictional engagement with the outside face of the wall 2 by the head 26 to hold plate 19 against movement. The plate 27 has a pointer or finger 27ª cooperable with suitable indicia extending circumferentially of the wall 2. On the front face of the plate 19 there is a metal supporting block 28 which extends longitudinally thereof and is fixed in position by screws 29. The block 28 is insulated from the plate 19 by electric insulating pads 30. Extending transversely through the outer end portion of block 28 and parallel to the plane of plate 19 there is a contact member 31 which is adjustably screw-threaded through the block and which is held in adjusted position by a clamping screw 32. Also supported in the block 28 there is a permanent bar magnet 33 which is fixed in a sleeve 34 adjustably screw-threaded through the block 28. The magnet 33 is positioned intermediate the contact member 31 and the shaft 7 and parallel and adjacent to the contact member 31. On the inner end of the block 28 there is a binding post or screw 35. Surrounding the sleeve 14 there is a disk or abutment member 36 of electric insulating material which bears against the front face of flange 20. Spaced from the disk 36 there is a disk or abutment member 37 also of electric insulating material which surrounds the sleeve 14. Interposed between and abutting disks 36, 37 there is a tubular insulating and spacer member 38 which surrounds the sleeve 14. Journaled about the shaft 7 between the disks 36, 37 there is a switch arm designated generally by the numeral 39 which comprises a metal disk 40 apertured to receive the tubular member 38 and bearing against the rear face of the abutment member 37. Extending radially from the periphery of the disk 40 there is a flange 41 having a rearwardly extending portion 42 parallel to shaft 7. Secured to the portion 42 there is an elongated backing plate 43 and a resilient switch blade 44 which extend radially from the shaft 7, the blade 44 having a contact member 45 cooperable with the relatively fixed contact member 31. The magnet 33 is preferably adjusted so that the blade 44 which serves as an armature for cooperation therewith will not engage the magnet when contact members 45 and 31 are in engagement with each other. Projecting radially from the periphery of the disk 40 there is an abutment member 46 which lies substantially opposite the flange 41 and which also serves as a binding post having a binding screw 47. Surrounding the tubular member 38 there is a tubular metal spacer member 47ᵃ which substantially fits between the disk 36 and the switch arm disk 40 to hold the disk 40 against axial movement and substantially against disk 37 without preventing free rotation of disk 40. A spring 48, under tension, surrounds spacer member 47ᵃ, and has one end anchored, as at 49, to the rod 18 and has its other end anchored, as at 50, to the abutment 46 so that the spring normally tends to urge the abutment 46 and the rod 18 into engagement with each other. It will be noted that the spring 48 serves as a lost-motion connection between the crank member 16 and the switch arm 39 so that when the contact member 45 is moved by operation of shaft 7 into engagement with contact member 31, the rod 18 may move away from abutment member 46 against the tension of spring 48. The free end of sleeve 14 is provided with a lateral flange 51 carried by a screw which is threaded into the bore of the sleeve and which is longitudinally apertured for passage of the shaft end 13 therethrough. Abutting the rear face of the flange 51 there is an abutment disk 52 of electric insulating material which is apertured to receive the sleeve 14. Also surrounding the sleeve 14 there is an abutment disk 53 of electric insulating material which is spaced from the disk 52 by a tubular insulating member 54 surrounding sleeve 14. Bearing against the rear face of abutment disk 53 there are a pair of overlapping supporting plates or members 55, 56 which are in abutting relation, the plate 56 engaging the rear face of plate 55. Interposed between the abutment disk 37 and the plate 56 there is a helical coil spring 57 under compression and which holds the disk 37 against tubular member 38 and the plates 55, 56 against the disk 53. The plates 55 and 56 extend radially from the shaft 7 with the plate 55 terminating adjacent the wall 2 in a forwardly extending curved flange 58. Parallel to the slot 23 there is a circumferential slot 59 through the wall 2 which overlies the flange 58, the slot being closed by a slidable closure strip 60 which is interposed between the wall 2 and the flange 58. The plate 55 is adjustable about the shaft 7 and is provided with a clamping means 61 such as a screw passed through the strip 60 and threaded into the flange 58, the screw having a head 62 by which the plate 55 may be adjusted and clamped in position. Interposed between the head 62 and the side wall 2 there is a clamping plate 63 having fingers depending into the slot 59 and having a pointer similar to the pointer on the plate 27 and cooperable with suitable indicia on the circumference of the wall 2. The plate 56 terminates short of the wall 2 and is adjustably fixed to the plate 55 for movement therewith, the plate 56 being clamped to plate 55 by a screw 64 threaded into plate 56 and extending through a slot 65 in the plate 55. Extending longitudinally of the plate 55 there is a metal supporting block 66 which is adjacent the side edge of plate 55 opposite the plate 56. Adjustably screw-threaded transversely through the block 66 adjacent its outer end and parallel to plate 55 there is a contact member 67. The block 66 also supports a permanent bar magnet 68 fixed in a sleeve member 69 adjustably screw-threaded transversely through block 66 parallel to contact member 67 and between the contact member 67 and the shaft 7. On the inner end of the block 66 there is a binding screw 70. The block 66 is secured to the plate 55 by screws 71 and is insulated from the plate 55 by pads of insulating material 72. Extended longitudinally of the supporting plate 56 there is an elongated supporting block 73 which is secured to the plate 56 by screws 74 and electrically insulated from the plate by pads of insulating material 75. Adjustably screw-threaded transversely through the outer end portion of the block 73 there is a contact member 76 which is positioned opposite the contact member 67 and which lies substantially parallel to the supporting plate 56. Between the contact member 76 and the shaft 7 there is a permanent bar magnet 77 fixed in an adjustable supporting sleeve 78 screw-threaded transversely through the block 73 and positioned substantially opposite the magnet 68. On the inner end of the block 73 there is a binding screw 79. Journaled about the shaft end 13 there is a switch arm designated generally by the numeral 80 cooperable with and positioned between the contact members 67 and 76 and which comprises a substantially circular plate or disk 81 apertured to receive the tubular member 54. Surrounding the member 54 there is a tubular metal spacer member 81ᵃ which substantially fits between the disk 52 and the switch arm plate 81 to hold the plate 81 against axial movement and substantially against the insulating disk 53 without preventing free rotation of plate 81. A spring 82 surrounds the spacer member 81ᵃ and is under tension, having one end anchored to the crank member rod 18, as at 83, and having its other end anchored, as at 84, to an abutment member 85 which extends radially from the periphery of the plate 81 so that the spring tends to urge the abutment member 85 and the rod 18 into engagement with each other. The abutment member 85 also serves as a terminal post and is provided with a binding screw 86. On the periphery of disk 81 susbtantially opposite abutment 85 there is a flange 87 projecting radially from shaft 7 between blocks 66 and 73. The flange 87 has a forwardly extending portion 88 to which a rigid elongated backing strip or plate 89 is secured. Positioned on the opposite sides of the backing plate 89 there are resilient metal switch blades 90, 91 which are also secured to the flange portion 88 and which have contact members 92, 93 respectively cooperable with the contact members 67, 76 respectively. The blades 90, 91 are also cooperable respectively with the magnets 68, 77, serving as armatures therefor. The magnets are preferably so adjusted that they will not be engaged by their respective switch blades when the contact members are in engagement with each other.

Positioned beneath the shaft 7 there is a supporting block 94 of electric insulating material which is supported within the casing on the wall 2 to which it is secured by screws 95. The block 94 supports a relay switch mechanism having an electromagnet with a coil winding 96 which is cooperable with an armature switch lever 97. On the end of the lever 97 there is a transversely extending contact blade 98 cooperable with spaced contact members 99 to close a circuit between the members 99. The contact members 99 are supported by arms 100, 101 which are rigidly secured to the block 94 by screws 102. The arms are provided respectively with binding posts 103, 104, see Fig. 5. A spring 105 acts on the lever 97 and acts to move and hold the contact arm 98 out of engagement with contacts 99 when the coil 96 is deenergized. A conduit fitting 106 is provided in the wall 2 for the admission of lead wires into the casing for connection to the binding posts 103, 104.

Secured to the outside face of the wall 2 there is an insulating block 107 which carries upper front and rear binding posts 108, 109 and lower front and rear binding posts 110, 111. The binding post 108 is connected to the contact member 76 by a lead wire 112 which is secured to the block 73 by the binding screw 79. The binding post 109 is connected to the contact member 31 by a lead wire 113 which is secured to the block 28 by the binding screw 35. Also connected to the block 28 by screw 35 there is a lead wire 114 which is connected at its other end to the switch arm 80 by the binding screw 86. The contact member 67 is electrically connected to the binding post 111 by a lead wire 115 which is secured to the block 66 by the binding screw 70. From the binding post 110 a lead wire 116 connects to one terminal of the magnet coil winding 96. From the other end or terminal of the coil 96 a lead wire 117 is connected to the switch arm 39 by the binding screw 47.

In Figure 1, I have shown the above described control means operatively connected in a heating system for controlling the heating apparatus which includes a hot air furnace 118 having draft inlet and check dampers 119, 120 respectively controlling combustion. The dampers are operatively connected by pull chains 121, 122 respectively to the lever arm 123 of an electrically operated damper actuating means 124 which is preferably an electrically energized heat motor having an electrically heated bulb element 125 and an expansion chamber 125ª for actuating the lever 123. The furnace 118 is provided with an air circulating fan 126 for increasing flow through the furnace bonnet 127 of air to be heated and supplied to a room or other space. The fan 126 is driven by an electric motor 127' having lead wires 128, 129. The control means above described is positioned to respond to the temperature of the air in the furnace bonnet and has the rear end of member 5 and the thermostatic coil 8 inserted thereinto through a suitable aperture with the plate 12 rigidly fixed to the bonnet wall and supporting the control means. The lead wire 129 extends through the fitting 106 and is secured to the terminal post 103 of the relay switch mechanism. From the other terminal post 104 a lead wire 130 extends to a suitable source of high voltage current supply. The lead wire 128 also connects to this source of current supply so that the motor 127' and the relay switch mechanism are in series circuit. A transformer 131 has its primary side connected by lead wires 132, 133 to the lead wires 130, 128 respectively so that the transformer is energized from the current source. The transformer secondary is connected by a lead wire 134 to the upper front binding post 108 and is connected by a lead wire 135 to the lower front binding post 110. From the binding post 108 a lead wire 136 extends to a room thermostat 137 positioned in a room or other space supplied with heated air from the furnace 118. From the other terminal of the switch mechanism of the room thermostat 137 a lead wire 138 connects to the upper rear binding post 109. The electric heating means for the bulb element 125 of the damper actuating means is connected by lead wires 139, 140 to the front and rear binding posts 110, 111 respectively.

The operation of my control means when employed for controlling the operation of the heating apparatus above described is as follows: In the drawings, referring in particular to Figs. 1 and 2, the parts are shown in the positions which they will assume when the room thermostat 137 is satisfied, that is, when the temperature of the room has reached the desired degree for which the thermostat is set and when the temperature of the air in the furnace bonnet is below the temperature at which operation of the fan 126 is desired. If the temperature of the room should now decrease so that the thermostat 137 calls for heat and closes its circuit between lead wires 136 and 138, then the following circuit will be established: from the transformer secondary through lead wire 134, terminal post 108, lead wire 136, thermostat 137, lead wire 138, terminal post 109, lead wire 113, binding screw 35, lead wire 114 to switch arm 80 through engaged contacts 92, 67 to binding screw 70 and thence via lead wire 115 to terminal post 111, from terminal post 111 through lead wire 140 to the heating element for bulb 125, the lead wire 139 to terminal post 110 and thence through lead wire 135 back to the transformer secondary. The energization of the damper actuating means 124 will rotate the lever 123 clockwise, facing Fig. 1, to increase the furnace draft by pulling upward on chain 121 to open the draft inlet damper 119 and by releasing chain 122 to permit damper 120 to close. As the temperature in the bonnet 127 increases due to opening of the draft and closing of the check dampers, the thermostatic coil 8 will rotate shaft 7 in a clockwise direction, facing Fig. 2, which will carry the switch arm 39 with it and move the contact member 45 toward its fixed contact member 31. When the temperature in the bonnet reaches the desired minimum temperature at which fan 126 may be efficiently operated to force air to be heated through the furnace bonnet, then the switch arm contact member 45 will be moved into engagement with contact member 31. A circuit will now be completed from binding screw 35 supplied with current from lead wire 113 as above described to switch arm 39 through the engaged contact members 31 and 45 and thence via lead wire 117 to the relay coil 96 and from the relay coil through lead wire 116 to binding post 110 and back to the transformer secondary via lead wire 135. Energization of the coil 96 will attract lever arm 97 to engage lever arm 98 with contact members 99 thereby closing the circuit to the fan motor 127' between lead wires 130 and 129. If the room temperature increases to a degree which satisfies the room thermostat 137, the thermostat 137 will break its circuit between lead wires 136 and 138 which will cut off current flow to the lead wire 113 thereby deenergizing the relay mechanism coil 96 and the damper actuating means 124 so that the fan 126 will be stopped and the draft damper 119 will be closed and check damper 120 will be opened to stop combustion. In the event the furnace bonnet temperature increases above the temperature at which switch arm 39 will be moved into engagement with its contact member 31 while the room thermostat is still calling for heat, then the clockwise rotation of crank member 16 will continue under the force of the thermostatic coil 8. The crank member 16 can continue to rotate due to the lost motion spring 48 and rod 18 and will move out of engagement with its abutment member 46 without injury to the switch mechanism. Substantially at the maximum desired bonnet temperature the crank member rod 18 will engage the abutment 85 on switch arm 80 and will start to move the arm 80 away from the supporting block 66. Engagement between the contact members 92 and 67 will however not be broken until the exact maximum temperature is reached as the magnet 68 will exert its attractive force on resilient switch blade 90 until the blade 90 is tensioned by rotation of arm 80 sufficiently to overcome the holding force of the magnet when contact between contact members 92 and 67 will be broken with a snap action. Disengagement of contact members 92 and 67 will break circuit between lead wires 139, 140 to deenergize the damper actuating means 124 to close the draft damper 119 and open check damper 120 as above described. The deenergization of the actuating means 124 will not however affect operation of the fan 126 which will continue in operation due to the engagement of switch arm 39 and contact member 31. The fan 126 will continue in operation until the room thermostat 137 is satisfied. Should the room thermostat 137 become satisfied after maximum bonnet temperature is reached thereby stopping fan 126, the temperature of the bonnet might continue to increase, particularly with a coal-fired furnace, even though the draft damper is closed and the check damper open. If the bonnet temperature does continue to increase so that clockwise rotation of shaft 7 continues under the force of thermostatic coil 8, the switch arm 80 will move its contact member 93 into engagement with contact member 76. This will again start operation of the fan 126 to cool the furnace bonnet 127 and prevent injury to the furnace due to overheating. The fan circuit through the room thermostat having been broken, the safety fan circuit will be as follows: from the transformer secondary through lead wire 134, terminal post 108, lead wires 112, binding screw 79, closed contact members 76, 93, switch arm 80 to its binding post 86 thence via lead wire 114 to block 28 through closed contact members 31, 45, switch arm 39 and its lead wire 117, relay coil 96, lead wire 116, binding post 110 and lead wires 135 back to the transformer secondary. Operation of the fan 126 will continue until the bonnet has been cooled sufficiently to cause counterclockwise rotation of shaft 7 by thermostatic coil 8 so that switch arm 80 will be moved away from supporting block 73 to disengage contact member 93 from its contact member 76. Disengagement of contact member 93 will be effected with a snap action due to the attractive force of magnet 77 for the resilient switch blade 91 thereby preventing arcing between the contact members. The minimum bonnet temperature at which operation of the fan 126 is to be started may be regulated by adjusting the position of supporting plate 19 about the shaft 7. As shown, the fan is set to be operated at a minimum temperature range which may be increased to require a higher bonnet temperature to start operation of the fan by clockwise rotation of plate 19, facing Fig. 2. The differential operation, that is, the difference between the temperature at which contact will be made between contact members 45 and 31 and the temperature at which contact will be broken therebetween may be regulated by adjusting the air gap between magnet 33 and switch blade 44 when the contact members are in engagement. This differential adjustment may be made either by adjusting the extent to which the contact member 31 projects from block 28 or by adjusting the magnet 33. It will be apparent that the closer the magnet end is to the blade 44 when contact is made, the lower the temperature will have to drop in the furnace bonnet relative to the temperature at which contact is made in order to break the fan circuit. The maximum predetermined bonnet temperature at which the damper actuating means 124 will be deenergized to close the draft and open the check dampers may be adjusted by rotation of supporting plate 55 which is shown set for the highest temperature adjustment. Counterclockwise rotation of supporting plate 55 about shaft 7 will result in breaking of contact between contact members 92 and 67 at a lower bonnet temperature. The differential operation may be adjusted as above described in connection with switch arm 39 and contact will be broken at a given high temperature and will be made at a predetermined relatively lower temperature depending on the differential adjustment. The adjustment of supporting plate 55 will also adjust the position of contact member 76 to regulate the bonnet temperature at which the fan 126 will be started in the event the bonnet temperature goes too high, but the difference between the temperature at which the dampers will be closed by breaking of contact between contact members 92 and 67 and the temperature at which operation of the fan will be started will remain constant. If it is desired to change the temperature at which the fan will be started while maintaining constant the temperature at which the draft damper will be closed and the check damper opened, then the supporting plate 56 may be adjusted relative to supporting plate 55 by loosening the clamping screw 64. The differential between the temperature at which contact member 93 will engage contact member 76 to start operation of the fan and the relatively lower temperature at which engagement between contact members 76 and 93 will be broken to stop the fan may be adjusted by regulating the position either of contact member 76 or magnet 77 as above described in connection with switch arm 39.

What I claim and desire to secure by Letters Patent of the United States is:

1. A device of the character described, comprising a supporting structure, a rotatable operating shaft journaled in said structure, means to rotate said shaft, a crank member fixed on one end of said shaft, a bearing sleeve surrounding said shaft and fixed to said structure, a switch arm positioned between said structure and said crank member and journaled on said sleeve for movement thereabout by said crank member, a contact member engageable by said arm, and a spring urging said arm and said crank member into engagement.

2. A device of the character described, comprising a supporting structure, a rotatable operating shaft journaled in said structure, means to rotate said shaft, a crank member fixed on one end of said shaft, a bearing sleeve surrounding said shaft and fixed to said structure, a switch arm positioned between said structure and said crank member and journaled on said sleeve, a contact member cooperable with said arm, and a coil spring surrounding said bearing sleeve, said spring having one end anchored to said arm and its other end anchored to said crank member and normally urging said crank member and said arm into engagement.

3. A device of the character described, comprising a supporting structure, a rotatable operating shaft journaled in said structure, means to rotate said shaft, a crank member fixed on one end of said shaft, a bearing sleeve surrounding said shaft and fixed to said structure, a switch arm positioned between said structure and said crank member and journaled on said sleeve, an adjustable supporting member journaled on said sleeve, a contact member cooperable with said arm and carried by said supporting member, holding means cooperable with said structure and said supporting member to fix said supporting member in adjusted position, and a spring urging said arm and said crank member into engagement.

4. A device of the character described, comprising a supporting structure, a rotatable operating shaft journaled in said structure, means to rotate said shaft, a crank member fixed on said shaft, spaced abutment members of insulating material surrounding said shaft, a tubular insulating member surrounding said shaft and spacing said abutment members, a switch arm rotatable about said shaft and apertured to receive said tubular member, said arm and said crank member being engageable whereby said arm is movable by said crank member, and a spring surrounding said tubular member and urging said arm into engagement with said crank member.

5. A device of the character described, comprising a supporting structure, a rotatable operating shaft journaled in said structure, means to rotate said shaft, a crank member fixed on said shaft, spaced abutment members of insulating material surrounding said shaft, a tubular insulating member surrounding said shaft and spacing said abutment members, a switch arm rotatable about said shaft and operable by said crank member, said switch arm being apertured to receive said tubular member, a tubular spacer member surrounding said tubular insulating member and spacing said switch arm from one of said abutment members, and a helical coil spring surrounding said tubular spaced member, said spring having one end anchored to said arm and its other end anchored to said crank member and urging said arm and said crank member into engagement.

6. A device of the character described, comprising a supporting structure, a rotatable operating shaft journaled in said structure, means to rotate said shaft, a switch arm journaled about said shaft, a second switch arm journaled about said shaft, a crank member fixed to said shaft and cooperable with said arms, and a lost-motion connection between said crank member and one of said arms whereby said crank member is movable to actuate the other of said arms when said one arm has reached its limit of movement.

7. A device of the character described, comprising a supporting structure, a rotatable operating shaft journaled in said structure, means to rotate said shaft, a switch arm journaled about said shaft, an adjustable supporting member journaled about said shaft, a contact member carried by said supporting member and cooperable with said arm, a supporting member adjustably fixed to said first-named supporting member, a contact member carried by said second-named supporting member and cooperable with said arm, and a crank member on said shaft and operable to actuate said arm.

8. A device of the character described, comprising a supporting structure, a rotatable operating shaft journaled in said structure, means to rotate said shaft, a switch arm journaled about said shaft, and adjustable supporting member journaled about said shaft, a contact member carried by said supporting member and cooperable with said arm, a second supporting member adjustably journaled about said shaft, a second switch arm journaled about said shaft, a contact member carried by said second-named supporting member and cooperable with said second-named switch arm, a crank member on said shaft and cooperable with said arms, and a lost-motion connection between said crank member and one of said arms whereby said crank member is movable to actuate the other of said arms when said one arm engages its contact member.

9. A device of the character described, comprising a casing having a curved side wall, a rotatable operating shaft extending into said casing concentrically with said wall, a supporting member journaled about said shaft and terminating adjacent said curved wall, said wall having a slot, clamping means extending radially of said shaft and movable in said slot and cooperable with said wall and said supporting member to hold said supporting member in adjusted position, a contact member carried by said supporting member, and a switch arm extending radially from said shaft and cooperable with said contact member, said arm being operatively connected to said shaft.

10. A device of the character described, comprising a casing having a curved side wall, a rotatable operating shaft extending into said casing concentrically with said wall, a supporting member journaled about said shaft and terminating adjacent said wall, said wall having a slot, clamping means extending radially of said shaft and movable in said slot and cooperable with said wall and said supporting member to hold said supporting member in adjusted position, a contact member carried by said supporting member, a switch arm extending radially from said shaft and cooperable with said contact member, and a lost-motion connection between said shaft and said arm.

11. A device of the character described, comprising a supporting structure, an operating shaft rotatably supported by said structure, means to rotate said shaft, a crank member operable by and mounted on said shaft, a switch arm positioned between said crank member and said structure and apertured to receive said shaft, a contact member cooperable with said arm, and a coil spring surrounding said shaft and having one end anchored to said crank member and its other end anchored to said arm whereby to urge said crank member and said arm into engagement with each other.

12. A device of the character described, comprising a supporting structure, an operating shaft rotatably supported by said structure, means to rotate said shaft, a crank member fixed on said shaft, a switch arm positioned between said structure and said crank member and journaled about said shaft, an adjustable supporting member journaled about said shaft, a contact member cooperable with said arm and carried by said supporting member, holding means cooperable with said structure and said supporting member to fix said supporting member in adjusted position, and a spring urging said arm and said crank member into engagement with each other.

13. A device of the character described, comprising a casing having a curved side wall, a rotatable operating shaft in said casing and concentric with said wall, a supporting member journaled about said shaft and terminating adjacent said wall, clamping means cooperable with and engaging said wall and said supporting member, said clamping means extending radially of said shaft and being operable to radially tension said supporting member to hold said supporting member in adjusted position, a contact member carried by said supporting member, and a switch arm extending radially from said shaft and cooperable with said contact member, said arm being operatively connected to said shaft.

14. A device of the character described, comprising a supporting structure, a rotatable operating shaft carried by said structure, means to rotate said shaft, a switch arm journaled about said shaft, an adjustable supporting member journaled about said shaft, a contact member carried by said supporting member and cooperable with said arm, a second adjustable supporting member journaled about said shaft, means operable to hold said supporting members together for unitary adjustment, a contact member carried by said second-named supporting member and cooperable with said arm, and a crank member on said shaft and operable to actuate said arm.

15. A device of the character described, comprising a supporting structure, a rotatable shaft carried by said structure, means to rotate said shaft, a switch arm operable by said shaft, said arm comprising a member journaled about said shaft, said member having a transverse extension substantially parallel to said shaft, a backing plate extending from said extension in the plane of said shaft, a flexible switch blade extending from said extension and along said plate, said blade and plate being relatively movable and said plate acting to reenforce said blade, and means fixing said blade and said plate to said extension.

16. A device of the character described comprising a supporting means, a shaft supported by said supporting means, means to rotate said shaft, a crank on said shaft, a sleeve member surrounding said shaft and carried by said supporting means, switch means including a movable contact member disposed between said supporting means and said crank and carried by said sleeve member, a contact member cooperable with said movable member to control an electric circuit, and lost-motion means urging said crank and said movable member into engagement.

17. A device of the character described comprising a supporting structure, an operating shaft rotatably carried by said structure, a member journaled for rotation around and relative to said shaft and having a portion extending radially of said shaft, a flexible switch blade secured to said member and extending along said radial portion, said blade and said portion being relatively movable and said portion acting to reenforce said blade upon movement of said member in one direction, and lost-motion means operatively connecting said shaft and said member.

18. A device of the character described comprising a supporting structure, an operating shaft rotatably carried by said structure, a member journaled for rotation around said shaft and having a supporting face substantially parallel to the longitudinal axis of said shaft, an elongated backing member secured to said journaled member and extending radially of said shaft, a flexible switch blade secured to said journaled member and extending radially of said shaft and along said backing member, said blade and said backing member being rigidly fixed to said supporting face and being movable relative to each other such that said backing member acts to reenforce said blade upon movement of said journaled member in one direction.

19. A device of the character described comprising a supporting structure, an operating shaft rotatably supported by said structure, a switch arm journaled for rotation around said shaft, an adjustable supporting member extending radially from said shaft and movable concentric of said shaft, a contact member carried by said supporting member and engageable by said arm, a second supporting member adjustable relative to said first-named supporting member, means to secure said supporting members together in adjusted position, a contact member carried by said second supporting member and engageable by said arm, said arm extending between said contact members, and means operatively connecting said shaft and said switch arm.

20. A device of the character described comprising a supporting structure, an operating shaft rotatably supported by said structure, a switch arm journaled for rotation around said shaft, an adjustable supporting member extending radially from said shaft and movable concentric of said shaft, a contact member carried by said supporting member and engageable by said arm, a second supporting member adjustable relative to said first-named supporting member, means to secure said supporting members together in adjusted position, a contact member carried by said second supporting member and engageable by said arm, said arm extending between said contact members, a crank member on and movable by said shaft, and resilient lost-motion means operatively connecting said crank member and said arm so that said arm is moved positively into engagement with one of said contact members and is movable by said lost-motion means into engagement with the other of said contact members.

EARNEST J. DILLMAN.